(12) United States Patent
Li et al.

(10) Patent No.: US 12,524,514 B2
(45) Date of Patent: Jan. 13, 2026

(54) SPEECH CONTROL SYSTEM AND METHOD, APPARATUS, DEVICE, MEDIUM, AND PROGRAM PRODUCT

(71) Applicant: HUAWEI TECHNOLOGIES CO., LTD., Shenzhen (CN)

(72) Inventors: Han Li, Shenzhen (CN); Zhiyuan Wu, Shenzhen (CN); Jun Wang, Shenzhen (CN); Lei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 18/363,532

(22) Filed: Aug. 1, 2023

(65) Prior Publication Data

US 2024/0020369 A1    Jan. 18, 2024

Related U.S. Application Data

(63) Continuation of application No. PCT/CN2021/142508, filed on Dec. 29, 2021.

(30) Foreign Application Priority Data

Feb. 2, 2021    (CN) .......................... 202110142643.X

(51) Int. Cl.
*G10L 17/22*      (2013.01)
*G06F 21/32*     (2013.01)
(Continued)

(52) U.S. Cl.
CPC .......... *G06F 21/32* (2013.01); *G10L 15/1815* (2013.01); *G10L 15/22* (2013.01); *G10L 15/30* (2013.01); *G10L 2015/223* (2013.01)

(58) Field of Classification Search
CPC .......... G06F 21/32; G06F 3/167; G06F 21/62; G10L 15/1815; G10L 15/22; G10L 15/30;
(Continued)

(56) References Cited

U.S. PATENT DOCUMENTS 9,653,075 B1 *   5/2017   Chen ...................... G10L 15/32
10,796,702 B2 *  10/2020  Li ........................... G10L 15/07
(Continued)

FOREIGN PATENT DOCUMENTS

CN    107153499 A    9/2017
CN    108415682 A    8/2018
(Continued)

*Primary Examiner* — Abul K Azad
(74) *Attorney, Agent, or Firm* — Leydig, Voit & Mayer, Ltd.

(57) ABSTRACT

A speech control system includes a first client running on a mobile terminal, a server end running on a server, and a second client running on a controlled terminal. The first client obtains identity information of a user, and sends the identity information of the user to the server end. The server end verifies the identity information of the user. The first client further collects speech data of the user, generates a speech control request based on the speech data, and sends the speech control request to the server end. When verification on the identity information succeeds, the server end generates a control instruction based on the speech control request, and sends the control instruction to the second client. The second client indicates the controlled terminal to execute the control instruction.

15 Claims, 10 Drawing Sheets

(51) Int. Cl.
　　　*G10L 15/18*　　　(2013.01)
　　　*G10L 15/22*　　　(2006.01)
　　　*G10L 15/30*　　　(2013.01)

(58) Field of Classification Search
　　　CPC . G10L 2015/223; G10L 15/26; H04L 12/282;
　　　　　　　H04L 2012/2841; H04L 2012/2849;
　　　　　　　H04W 12/50; H04W 12/06; H04N
　　　　　　　21/42203; H04N 21/42228; H04N
　　　　　　　21/42204
　　　See application file for complete search history.

(56) References Cited

U.S. PATENT DOCUMENTS

| | | | |
|---|---|---|---|
| 11,521,609 B2* | 12/2022 | Yamamoto | G06F 3/167 |
| 11,983,463 B2* | 5/2024 | Plagge | G06F 3/167 |
| 2006/0280127 A1 | 12/2006 | Mizuno et al. | |
| 2015/0154976 A1* | 6/2015 | Mutagi | G06F 3/167 |
| | | | 704/275 |
| 2018/0182399 A1* | 6/2018 | Suyama | G10L 15/32 |
| 2019/0235831 A1 | 8/2019 | Bao | |
| 2020/0220935 A1* | 7/2020 | Bao | G10L 17/22 |
| 2021/0144780 A1* | 5/2021 | Hao | H04W 4/80 |

FOREIGN PATENT DOCUMENTS

| | | |
|---|---|---|
| CN | 109599100 A | 4/2019 |
| CN | 110148410 A | 8/2019 |

\* cited by examiner

SPEECH CONTROL SYSTEM AND METHOD, APPARATUS, DEVICE, MEDIUM, AND PROGRAM PRODUCT

CROSS-REFERENCE TO RELATED APPLICATIONS

This application is a continuation of International Application No. PCT/CN2021/142508, filed on Dec. 29, 2021, which claims priority to Chinese Patent Application No. 202110142643.X, filed on Feb. 2, 2021. The disclosures of the aforementioned applications are hereby incorporated by reference in their entireties.

TECHNICAL FIELD

This application relates to the field of artificial intelligence (AI) technologies, and in particular, to a speech control system, a corresponding method, an apparatus, a device, a computer-readable storage medium, and a computer program product.

BACKGROUND

With continuous development of speech technologies, especially speech recognition technologies, it is gradually possible to perform speech control on a device by using a speech. Compared with conventional control manners such as mouse control, keyboard control, button control, and remote control, speech control does not require a user to manually enter related content and trigger a corresponding control by using a mouse, and does not require the user to know functions of various buttons or remote controls in advance. The user can control a device by uttering a corresponding speech based on an intention of the user. Speech control has a relatively low usage requirement, and a control manner is more flexible and convenient. Therefore, speech control has a wide application prospect.

At present, many devices do not have native support for speech control. For example, many smart televisions and conference terminals do not support speech control. Consequently, a control process is relatively complex, and user experience is poor. How to enable a device that does not have native support for speech control to support speech control has become a major concern in the industry.

SUMMARY

This application provides a speech control system. The system collects speech data of a user by using a microphone array provided by a mobile terminal, and performs speech recognition on the speech data by using the mobile terminal or a server. In this way, a controlled terminal that does not have native support for speech control can support speech control, and the controlled terminal does not need to be reconstructed, so that costs are relatively low and availability is relatively high. In addition, a server end in the system verifies identity information of the user, and controls the controlled terminal when verification succeeds, so that security is further improved. This application further provides a method, an apparatus, a device, a computer-readable storage medium, and a computer program product that are corresponding to the foregoing system.

According to a first aspect, this application provides a speech control system, configured to control a controlled terminal. The system includes a first client, a server end, and a second client. The first client runs on a mobile terminal, the server end runs on a server, and the second client runs on the controlled terminal.

The mobile terminal refers to a movable and portable terminal. In some implementations, the mobile terminal may have a display. The mobile terminal includes but is not limited to a smartphone, a tablet computer, a personal digital assistant, or a smart wearable device. The smart wearable device includes a smart band, a smart watch, smart glasses, or the like. The server may be a cloud server in a cloud environment, for example, a central server or an edge server. The server may alternatively be a server in a local data center, and the local data center refers to a data center to which a user belongs. The controlled terminal may be a terminal with a display, for example, may be a smart television or a conference terminal.

Specifically, the first client is configured to obtain identity information of a user, and send the identity information to the server end. The first client is further configured to collect speech data of the user, generate a speech control request based on the speech data, and send the speech control request to the server end. The server end is configured to verify the identity information sent by the first client, and when verification on the identity information succeeds, process the speech control request sent by the first client, for example, generate a control instruction based on the speech control request, and then send the control instruction to the second client. The second client is configured to indicate the controlled terminal to execute the control instruction, to implement speech control on the controlled terminal. It can be learned that, even if the controlled terminal has no built-in speech chip or microphone array, the speech control system can still implement speech control on the controlled terminal.

The speech data of the user is collected by using a microphone array provided by the mobile terminal, the speech control request can be generated based on the speech data, and then the server end controls the controlled terminal based on the speech control request. Even if the controlled terminal has no speech chip or microphone array, the user can still perform speech control on the controlled terminal by using the mobile terminal and the server. In this way, the controlled terminal that does not have native support for speech control can also support speech control, and the controlled terminal does not need to be reconstructed, so that costs are reduced and availability is improved. In addition, the mobile terminal collects the speech data of the user, so that the user can randomly change a location, and a location range of the user is not limited.

Moreover, the server end further performs identity verification on the user based on the identity information sent by the first client running on the mobile terminal. When verification succeeds, the server end controls the controlled terminal based on the speech control request. In this way, an unauthorized user can be prevented from performing speech control on the controlled terminal, and security is improved.

In some possible implementations, the speech control request carries an identifier of the controlled terminal. The identifier is generally unique and is used for distinguishing from another controlled terminal in a network. Based on this, the identifier may be a media access control address, a network address, or a universally unique identifier. The network address may be specifically an internet protocol address. The server end may identify the controlled terminal by using the identifier.

The first client can obtain the identifier of the controlled terminal in a plurality of manners. Specifically, when the mobile terminal supports short-range wireless communication (also referred to as near field communication), the mobile terminal may approach a near field communication module of the controlled terminal, for example, a built-in near field communication module of the controlled terminal or a near field communication module independent of the controlled terminal, to establish a near field communication connection. In this way, the first client can obtain the identifier of the controlled terminal through the near field communication connection.

When the mobile terminal has a graphic scanning capability, the first client may further invoke a camera of the mobile terminal to scan an identification code, to obtain the identifier of the controlled terminal. The identification code may be a QR code, a bar code, or the like. The display of the controlled terminal may display in advance a QR code, the user may hold the mobile terminal and scan the QR code by using the mobile terminal, and the first client running on the mobile terminal may parse the QR code and obtain the identifier of the controlled terminal.

The first client may alternatively directly receive the identifier that is of the controlled terminal and that is entered by the user. For example, the first client presents an interaction interface to the user, and the user may enter the identifier of the controlled terminal by using the interaction interface, so that the first client can receive the identifier entered by the user.

When the mobile terminal supports a Bluetooth function, the mobile terminal may alternatively be connected to the controlled terminal through Bluetooth. In this way, the first client running on the mobile terminal can obtain the identifier of the controlled terminal through Bluetooth. When the mobile terminal supports a connection through a wireless local area network or a wireless hotspot, the first client running on the mobile terminal may alternatively obtain the identifier of the controlled terminal through the wireless local area network or the wireless hotspot. The wireless local area network is used as an example. When the mobile terminal and the controlled terminal access a same wireless local area network, the mobile terminal and the controlled terminal establish a connection by using an access point of the wireless local area network, and the mobile terminal can obtain the identifier of the controlled terminal through the connection. In this way, the first client can obtain the identifier of the controlled terminal.

In the method, the mobile terminal can obtain the identifier of the controlled terminal in various convenient manners, to implement speech control on the controlled terminal corresponding to the identifier. A control manner is user-friendly, and user experience is improved. In addition, the mobile terminal can perform speech control on the controlled terminal in any one of the foregoing plurality of manners, so that availability and compatibility are relatively high.

In some possible implementations, after verification performed by the server end on the identity information of the user succeeds, the server end may further return permission information of the user to the first client based on the identity information of the user. In consideration of security, for different users, the server end sets different permission based on identity information of the users. For example, permission of an internal employee of a company may be different from that of an external supplier. In some examples, the internal employee of the company has permission to adjust brightness and volume, switch screen display content, perform file projection, and open a common file of the company, and the external supplier has the permission to adjust brightness and volume, switch screen display content, and perform file projection, but does not have the permission to open a common file of the company.

Specifically, the server end may pre-configure control permission of different users. In this way, the server end may determine the permission information of the user based on the identity information of the user, and then return the permission information to the first client. The first client may determine, based on the permission information of the user, a function that matches the permission information, and then present the function to the user. The user can select a corresponding function based on the function presented by the first client, to control the controlled terminal.

In this way, the speech control system can implement personalized speech control based on permission of different users, to meet diversified service requirements.

In some possible implementations, the server end may further dynamically adjust the control permission of the user. A conference scenario is used as an example. The server end can dynamically allocate permission information to a conference participant based on a requirement of the participant in a conference process. For example, after a company employee Zhang San has delivered a speech on a business summary, a non-company employee Li Si needs to present a cooperation project in a second half of the year. In this case, the server end may temporarily authorize the non-company employee Li Si to use a file page turning function, so that Li Si can turn a page of a related file. After Li Si completes presentation of the cooperation project, the server end may cancel authorization of the file page turning function for Li Si. In this way, the speech control system can dynamically adjust the permission information of the user based on an actual requirement, and achieve a balance between a requirement and security.

In some possible implementations, the speech control request includes the speech data or text data corresponding to the speech data, and the server end recognizes an intention of the user based on the speech data or the text data.

The first client may directly send the collected speech data of the user to the server end, and the server end recognizes the speech data of the user by using an automatic speech recognition technology, to obtain the text data corresponding to the speech data of the user. In some other implementations, the first client may first recognize the collected speech data of the user by using the automatic speech recognition technology to obtain the text data corresponding to the speech data of the user, then use the speech control request to carry the text data, and send the speech control request to the server end. In this way, a data processing amount of the server in which the server end is located can be reduced, and computing pressure of the server can be reduced.

The first client may alternatively first recognize the speech data of the user by using the automatic speech recognition technology to obtain the text data corresponding to the speech data, and then process the text data by using a natural language processing technology, to recognize the intention of the user. The first client may directly use the speech control request to carry the intention, without carrying the speech data or the text data, and then send the speech control request to the server end. A data volume of the intention is less than a data volume of the text data or the speech data. In this way, transmission overheads can be reduced, and bandwidth resource occupation can be reduced. In addition, the server end may directly obtain the intention of the user from the speech control request, so that the server in which the server end is located avoids consuming a large amount of computing power to perform intention recognition, and computing pressure of the server is reduced.

In some possible implementations, the server end obtains the control instruction based on the intention of the user. Specifically, the server stores an instruction set of at least one controlled terminal. The server end may store instruction sets of controlled terminals of different brands, different series, and different models. The instruction set includes at least one control instruction supported by the controlled terminal. The control instruction is an instruction that can be identified by the controlled terminal, for example, may be a binary instruction.

The server end may determine the instruction set of the controlled terminal based on the identifier of the controlled terminal, and then search the instruction set of the controlled terminal for a control instruction that matches the intention of the user. When searching succeeds, the server end can obtain the control instruction. When searching fails, the server end may send prompt information to the first client, and the first client presents the prompt information on a screen of the mobile terminal. The prompt information may be specifically used to prompt the user that the controlled terminal does not support a function corresponding to the speech data of the user. For example, the controlled terminal does not support a function such as file projection. In this way, it can be ensured that the controlled terminal can execute, under an indication of the second client, all control instructions sent by the server end to the second client, so that a case in which the control instruction cannot be executed because the controlled terminal does not support the control instruction is avoided. Further, when the controlled terminal does not support the control instruction, the server end does not send the control instruction to the second client, so that network overheads are further reduced.

In some possible implementations, the server end may first search, based on the intention, for at least one control instruction that matches the intention, and then obtain, from the at least one control instruction, a control instruction that matches the identifier of the controlled terminal, to control the corresponding controlled terminal by using the control instruction.

In some embodiments, the server end may pre-establish a mapping relationship between an intention and a control instruction in an instruction set. In this way, the server end may search, based on the mapping relationship, for the control instruction that matches the intention of the user. Further, to improve search efficiency, the server end may establish a mapping relationship between an intention code and a control instruction in an instruction set. After recognizing the intention of the user, the server end determines an intention code corresponding to the intention, and then searches, by using the intention code, for the control instruction that matches the intention of the user. The intention code may be specifically represented as a character string, for example, a digit string, a letter string, or a mixed string of digits and letters.

According to a second aspect, this application provides a speech control method. The method may be performed by a speech control system, the speech control system includes a first client, a server end, and a second client, the first client runs on a mobile terminal, the server end runs on a server, the second client runs on a controlled terminal, and the method includes:
  the first client obtains identity information of a user, sends the identity information of the user to the server end, collects speech data of the user, generates a speech control request based on the speech data, and sends the speech control request to the server end;
  the server end verifies the identity information of the user; and when verification on the identity information of the user succeeds, the server end generates a control instruction based on the speech control request, and sends the control instruction to the second client; and
  the second client indicates the controlled terminal to execute the control instruction.

In the method, the speech data of the user is collected by using a microphone array provided by the mobile terminal of the user. This helps the mobile terminal or the server perform speech recognition on the speech data. Even if the controlled terminal has no speech chip or microphone array, the user can still perform speech control on the controlled terminal by using the mobile terminal and the server. In addition, the controlled terminal does not need to be reconstructed, so that costs are relatively low, and availability is relatively high. Further, the first client on the mobile terminal collects the identity information of the user, and sends the identity information to the server end on the server. The server end verifies the identity information of the user, and when verification on the identity information of the user succeeds, generates the control instruction based on the speech control request, and sends the control instruction to the second client, so that the second client indicates the controlled terminal to execute the control instruction. Therefore, a case in which an unauthorized user performs speech control on the controlled terminal is avoided, and security is improved.

In some possible implementations, the speech control request carries an identifier of the controlled terminal, and the method further includes:
  the first client obtains the identifier of the controlled terminal through near field communication NFC; or
  the first client obtains the identifier of the controlled terminal by scanning an identification code; or
  the first client obtains the identifier that is of the controlled terminal and that is entered by the user; or
  the first client obtains the identifier of the controlled terminal by connecting to the controlled terminal through Bluetooth; or
  the first client obtains the identifier of the controlled terminal by connecting to the controlled terminal through a wireless local area network or a wireless hotspot.

In this way, the first client can obtain the identifier of the controlled terminal in a plurality of manners, to control the controlled terminal corresponding to the identifier.

In some possible implementations, the method further includes:
  the server end returns permission information of the user to the first client based on the identity information of the user; and
  the first client presents, on a screen of the mobile terminal, a function that matches the permission information of the user.

In this way, the server end can recommend a function based on the identity information of the user, and the first client presents, to the user on the screen of the mobile terminal, a function corresponding to the user, to facilitate selection of the user.

In some possible implementations, the method further includes:
  the server end sends the identity information of the user to the second client; and
  the second client presents the identity information of the user on a screen of the controlled terminal.

The server end sends, to the second client, the identity information of the user who currently sends the speech control request, and the second client presents the identity information by using the controlled terminal. In this way, another user can know an identity of the user who currently controls the controlled terminal.

In some possible implementations, that the server end generates a control instruction based on the speech control request includes:
  the server end recognizes an intention of the user based on the speech control request; and
  the server end obtains the control instruction based on the intention of the user.

In some possible implementations, that the server end obtains the control instruction based on the intention of the user includes:
  the server end searches an instruction set corresponding to the controlled terminal for a control instruction that matches the intention of the user; and when searching succeeds, obtains the control instruction; or when searching fails, sends prompt information to the first client, where the prompt information is used to indicate that the controlled terminal does not support a function corresponding to the speech data of the user; and
  the method further includes:
  the first client presents the prompt information on the screen of the mobile terminal.

In this way, it can be ensured that the controlled terminal can execute, under an indication of the second client, all control instructions sent by the server end to the second client, so that a case in which the control instruction cannot be executed because the controlled terminal does not support the control instruction is avoided. When the controlled terminal does not support the control instruction, the server end does not send the control instruction to the second client, so that network overheads between the server end and the second client can be reduced.

According to a third aspect, this application provides a first client. The first client includes:
  a communications unit, configured to obtain identity information of a user, and send the identity information of the user to a server end;
  a collection unit, configured to collect speech data of the user; and
  a request generation unit, configured to generate a speech control request based on the speech data of the user.

The communications unit is further configured to send the speech control request to the server end.

In some implementations, the communications unit is configured to:
  obtain an identifier of a controlled terminal through near field communication; or
  obtain an identifier of a controlled terminal by scanning an identification code; or
  receive an identifier that is of a controlled terminal and that is entered by the user; or
  obtain an identifier of a controlled terminal by connecting to the controlled terminal through Bluetooth; or
  obtain an identifier of a controlled terminal by connecting to the controlled terminal through a wireless local area network or a wireless hotspot.

In some implementations, the first client further includes a display unit.

The communications unit is configured to receive permission information of the user that is returned by the server end based on the identity information of the user.

The display unit is configured to present, on a screen of a mobile terminal, a function that matches the permission information of the user.

In some implementations, the communications unit is configured to:
  receive prompt information sent by the server end, where the prompt information is used to indicate that the controlled terminal does not support a function corresponding to the speech data of the user.

The display unit is configured to present the prompt information on the screen of the mobile terminal.

According to a fourth aspect, this application provides a server end. The server end includes:
  a communications unit, configured to receive identity information of a user that is sent by a first client;
  a verification unit, configured to verify the identity information of the user, where
  the communications unit is further configured to receive a speech control request sent by the first client; and
  an instruction generation unit, configured to generate a control instruction based on the speech control request when verification on the identity information of the user succeeds.

The communications unit is further configured to send the control instruction to a second client.

In some implementations, the server end further includes a determining unit.

The determining unit is configured to determine permission information of the user based on the identity information of the user.

The communications unit is configured to return the permission information of the user to the first client.

In some implementations, the communications unit is configured to:
  send the identity information of the user to the second client.

In some implementations, the instruction generation unit is configured to:
  recognize an intention of the user based on the speech control request, and
  obtain the control instruction based on the intention of the user.

In some implementations, the instruction generation unit is configured to:
  search an instruction set corresponding to a controlled terminal for a control instruction that matches the intention of the user; and when searching succeeds, obtain the control instruction.

The communications unit is configured to send prompt information to the first client when searching fails, where the prompt information is used to indicate that the controlled terminal does not support a function corresponding to speech data of the user.

According to a fifth aspect, this application provides a computer cluster. The computer cluster includes at least one computer. The computer includes a processor and a memory. The processor and the memory communicate with each other. The processor is configured to execute instructions stored in the memory, to enable the computer cluster to perform the speech control method according to any implementation of the second aspect.

The computer cluster may include a mobile terminal, a server, and a controlled terminal. The mobile terminal, the server, and the controlled terminal each include a processor and a memory. The processors of the mobile terminal, the server, and the controlled terminal execute instructions stored in the respective memories, to perform the speech control method according to any one of the implementations of the second aspect.

According to a sixth aspect, this application provides a computer-readable storage medium. The computer-readable storage medium includes instructions, and the instructions instruct the computer cluster in the fifth aspect to perform the speech control method according to any one of the implementations of the second aspect.

The instructions may be stored in the computer-readable storage medium in a form of a software package, and the computer-readable storage medium may include a plurality of software packages, for example, a first software package, a second software package, and a third software package. When the first software package runs on a computer, the method performed by the first client in the second aspect is performed. When the second software package runs on a computer, the method performed by the server end in the second aspect is performed. When the third software package runs on a computer, the method performed by the second client in the second aspect is performed.

According to a seventh aspect, this application further provides a computer program product including instructions. When the computer program product runs on a mobile terminal, the mobile terminal is enabled to perform the steps performed by the first client in any one of the second aspect or the implementations of the second aspect.

According to an eighth aspect, this application further provides a computer program product including instructions. When the computer program product runs on a server, the server is enabled to perform the steps performed by the server end in any one of the second aspect or the implementations of the second aspect.

According to a ninth aspect, this application further provides a computer program product including instructions. When the computer program product runs on a controlled terminal, the controlled terminal is enabled to perform the steps performed by the second client in any one of the second aspect or the implementations of the second aspect.

In this application, based on the implementations provided in the foregoing aspects, further combination may be performed to provide more implementations.

BRIEF DESCRIPTION OF DRAWINGS

To describe the technical methods in embodiments of this application more clearly, the following briefly describes the accompanying drawings used in describing the embodiments.

DESCRIPTION OF EMBODIMENTS

Figure 1:
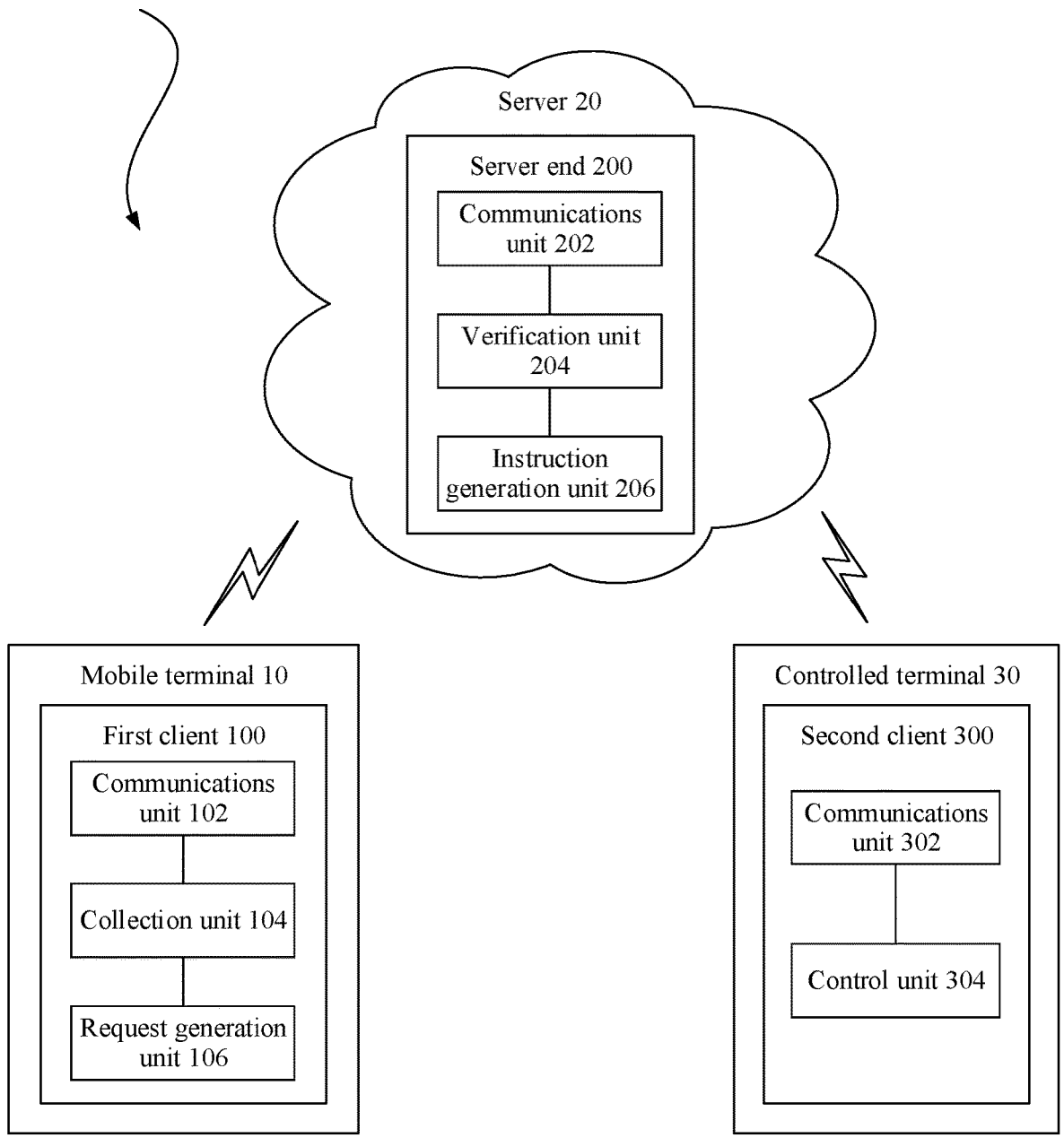
FIG. 1 is a diagram of a system architecture of a speech control system according to an embodiment of this application.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

Some technical terms used in embodiments of this application are first described.

Speech control refers to controlling a controlled device by using a speech, so that the controlled device executes a corresponding instruction based on the speech. Different from conventional mouse control, keyboard control, button control, and remote control, speech control does not require a user to manually enter related content and trigger a corresponding control by using a mouse, and does not require the user to know in advance functions of various buttons or remote controls. The user can control the controlled device by uttering a corresponding speech based on an intention of the user. Speech control is widely used in many fields because of a relatively low usage requirement and a more convenient control manner. The controlled device is specifically a device under control, and the controlled device may be a controlled terminal. The controlled terminal may be a terminal with a display. In some possible implementations, the controlled terminal further has an operating system, and the controlled terminal executes a control instruction by using the operating system, to implement a corresponding control function.

The controlled terminal includes but is not limited to a device such as a smart television or a conference terminal. The controlled terminal is widely used in different places such as work, life, and study. In a living place, controlled terminals are usually used in scenarios such as television entertainment and home games. In a working place, controlled terminals are widely used in scenarios such as local whiteboard discussion in a conference room, content projection and demonstration, and a remote video conference. In a studying place, controlled terminals are used in scenarios such as teacher-student teaching in a classroom, remote teaching interaction, and multi-screen interaction.

An automatic speech recognition (ASR) technology and a natural language processing (NLP) technology are usually used in a process of controlling the controlled device by using a speech. The following separately describes the technologies.

The ASR technology is a technology that converts a speech into a computer-readable text. A principle of ASR is specifically as follows: Feature extraction is performed on a speech, to obtain a speech feature vector sequence, and then the speech feature vector sequence is decoded by using an acoustic model and a language model, to obtain a text corresponding to the speech.

The NLP technology is a technology that processes a natural language, so that a computer can understand the natural language of a human society, to implement human-machine communication. NLP may be specifically classified into two main categories: natural language understanding (NLU) and natural language generation (NLG). A principle of NLU is specifically as follows: A text is segmented to obtain a token sequence, then a numerical vector or a matrix of the token sequence is obtained based on the token sequence by using a text representation model such as a word vector space model or a distributed representation model, and then key information such as an entity, a triplet, an intention, and an event is obtained based on the numerical vector or the matrix by using a classification algorithm, a sequence annotation algorithm, and the like.

Currently, many controlled terminals such as a smart television and a conference terminal do not have a built-in microphone array or speech chip. Without the built-in microphone array, it is difficult for the controlled terminal to collect a speech of a user. Without the built-in speech chip, it is difficult for the controlled terminal to recognize a speech. As a result, it is difficult for many controlled terminals to support speech control.

In view of this, this application provides a speech control system. The speech control system includes a first client, a server end, and a second client. The first client runs on a mobile terminal, the server end runs on a server, and the second client runs on a controlled terminal. The first client is configured to obtain identity information of a user, send the identity information of the user to the server end, collect speech data of the user, generate a speech control request based on the speech data, and send the speech control request to the server. The server end verifies the identity information of the user, and when verification on the identity information of the user succeeds, generates a control instruction based on the speech control request, and sends the control instruction to the second client. The second client is configured to indicate the controlled terminal to execute the control instruction.

The speech data of the user is collected by using a microphone array provided by the mobile terminal, the speech control request can be generated based on the speech data, and then the server end controls the controlled terminal based on the speech control request. When the controlled terminal has no speech chip or microphone array, the user can still perform speech control on the controlled terminal by using the mobile terminal and the server. In this way, the controlled terminal that does not have native support for speech control can also support speech control, and the controlled terminal does not need to be reconstructed, so that costs are reduced and availability is improved.

In addition, the server end further performs identity verification on the user based on the identity information sent by the first client running on the mobile terminal. When verification succeeds, the server end controls the controlled terminal based on the speech control request. In this way, an unauthorized user can be prevented from performing speech control on the controlled terminal, and security is improved.

The speech control system provided in embodiments of this application may be configured to control a controlled terminal in a home scenario or a working scenario. For example, in a home scenario, the controlled terminal may be a smart television, and the speech control system can enable the user to switch a channel of the smart television, adjust volume, or the like in a speech manner. In this way, family members can perform speech control on the smart television by using respective mobile terminals. For another example, in a working scenario, the controlled terminal may be a conference terminal, and the speech control system can enable the user to adjust brightness of the conference terminal, project a related file onto a display of the conference terminal, or the like in a speech manner. In this way, conference participants can perform speech control on the conference terminal by using respective mobile terminals. In addition, the mobile terminal of the conference participant is relatively close to the conference participant, and a speech that is of the conference participant and that is collected by the mobile terminal is clearer, so that accuracy of speech recognition can be improved.

For ease of understanding by a person skilled in the art, in the following embodiments of this application, an example in which a controlled terminal in a working scenario is controlled is used to describe the speech control system provided in this application. However, the speech control system provided in this application is not limited to controlling a conference terminal in a working scenario.

The following describes, with reference to the accompanying drawings, a system architecture of a speech control system provided in embodiments of this application.

Referring to a diagram of a system architecture of a speech control system shown in FIG. 1, the speech control system 1000 includes a first client 100, a server end 200, and a second client 300. The first client 100 runs on a mobile terminal 10, the server end 200 runs on a server 20, and the second client 300 runs on a controlled terminal 30.

The first client 100 includes a communications unit 102, a collection unit 104, and a request generation unit 106. The communications unit 102 is configured to obtain identity information of a user, and send the identity information of the user to the server end 200. The collection unit 104 is configured to collect speech data of the user. The request generation unit 106 is configured to generate a speech control request based on the speech data of the user, and then the communications unit 102 is further configured to send the speech control request to the server end 200.

The server end 200 includes a communications unit 202, a verification unit 204, and an instruction generation unit 206. The communications unit 202 is configured to receive the identity information sent by the first client 100. The verification unit 204 is configured to verify the identity information of the user. The communications unit 202 is further configured to receive the speech control request sent by the first client 100. The instruction generation unit 206 is configured to generate a control instruction based on the speech control request when verification on the identity information of the user succeeds. The communications unit 202 is further configured to send the control instruction to the second client 300.

The second client 300 includes a communications unit 302 and a control unit 304. The communications unit 302 is configured to receive the control instruction sent by the server end 200. The control unit 304 indicates the controlled terminal 30 to execute the foregoing control instruction. In this way, speech control of the controlled terminal 30 can be achieved.

It should be noted that, in the embodiment shown in FIG. 1, the mobile terminal 10 refers to a movable and portable terminal. The mobile terminal 10 includes but is not limited to a smartphone, a tablet computer, a personal digital assistant (PDA), or a smart wearable device. The smart wearable device includes a smart band, a smart watch, smart glasses, or the like. The controlled terminal 30 is a terminal under control. The controlled terminal 30 may be a terminal with a display, for example, may be a smart television or a conference terminal.

The embodiment shown in FIG. 1 is described by using an example in which the server 20 is a cloud server in a cloud environment. The cloud environment refers to a computer cluster that is owned by a cloud service provider and that is used to provide computing, storage, and communication resources. The computer cluster may be a central cloud computing cluster, or may be an edge cloud computing cluster. Based on this, the server 20 may be a central server, or may be an edge server. In some possible implementations, the server 20 may alternatively be a server 20 in a local data center. The local data center refers to a data center to which the user belongs.

The foregoing describes the speech control system 1000 provided in embodiments of this application. The following describes a speech control method provided in embodiments of this application from a perspective in which a first client 100 on a mobile terminal 10 performs speech control on a controlled terminal 30 by using a server end 200 on a server 20.

Figure 2:
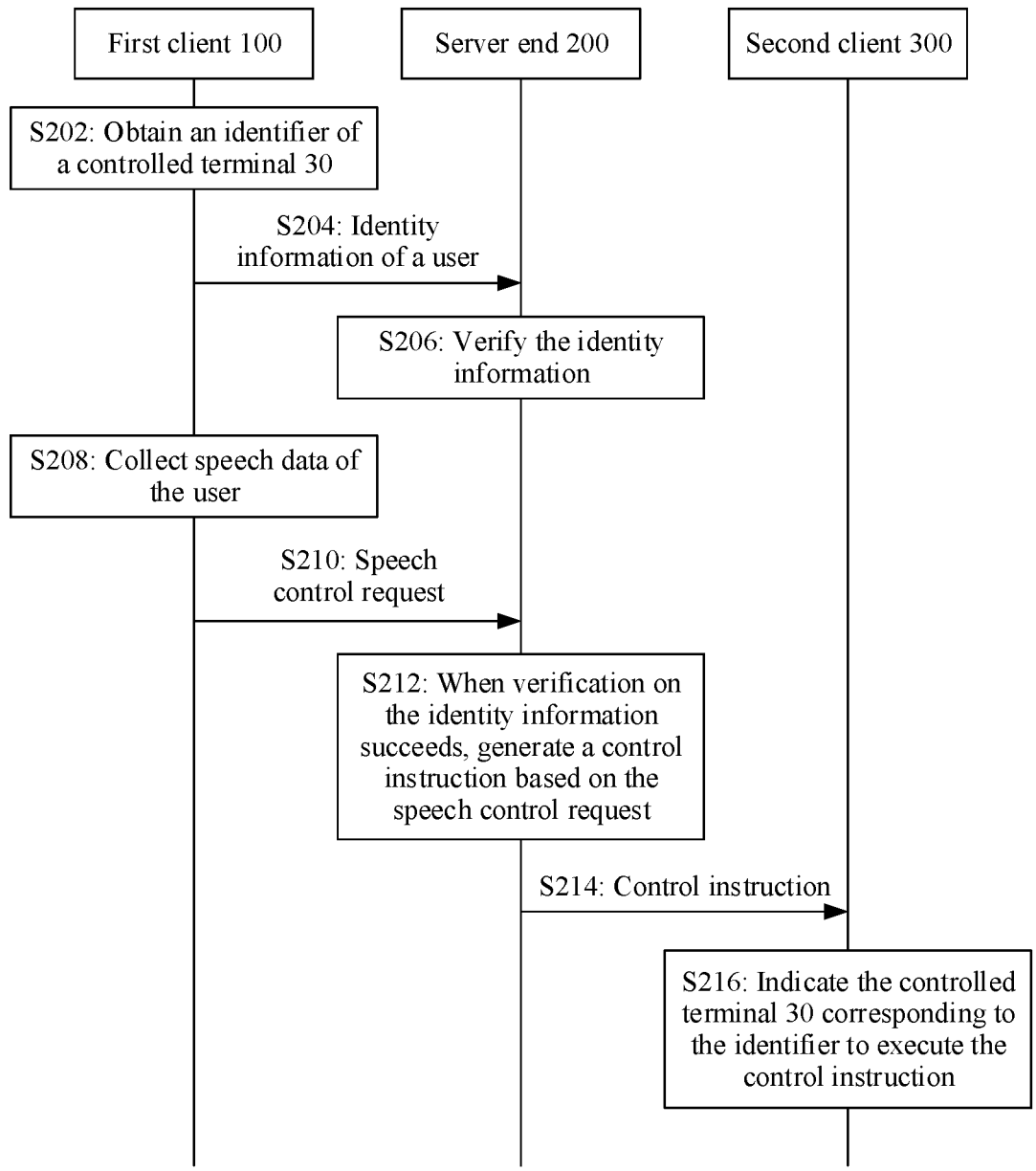
FIG. 2 is an interaction flowchart of a speech control method according to an embodiment of this application.

Referring to an interaction flowchart of a speech control method shown in FIG. 2, the method includes the following steps.

S202: The first client 100 obtains an identifier of the controlled terminal 30.

The controlled terminal 30 may be a terminal with an operating system and a screen (for example, a display), and includes but is not limited to a smart television or a conference terminal. The controlled terminal 30 has the identifier, and the identifier is usually unique and can be used for distinguishing from another controlled terminal 30. In some embodiments, the identifier of the controlled terminal 30 may be a media access control (MAC) address, a network address, or a universally unique identifier (UUID) of the controlled terminal 30. The network address may be specifically an internet protocol (IP) address.

The first client 100 can obtain the identifier of the controlled terminal 30 in a plurality of manners. The manners are separately described below.

Manner 1: The mobile terminal 10 moves close to the controlled terminal 30. In this way, the first client 100 running on the mobile terminal 10 can obtain the identifier of the controlled terminal 30 through near field communication (NFC).

Figure 3A:
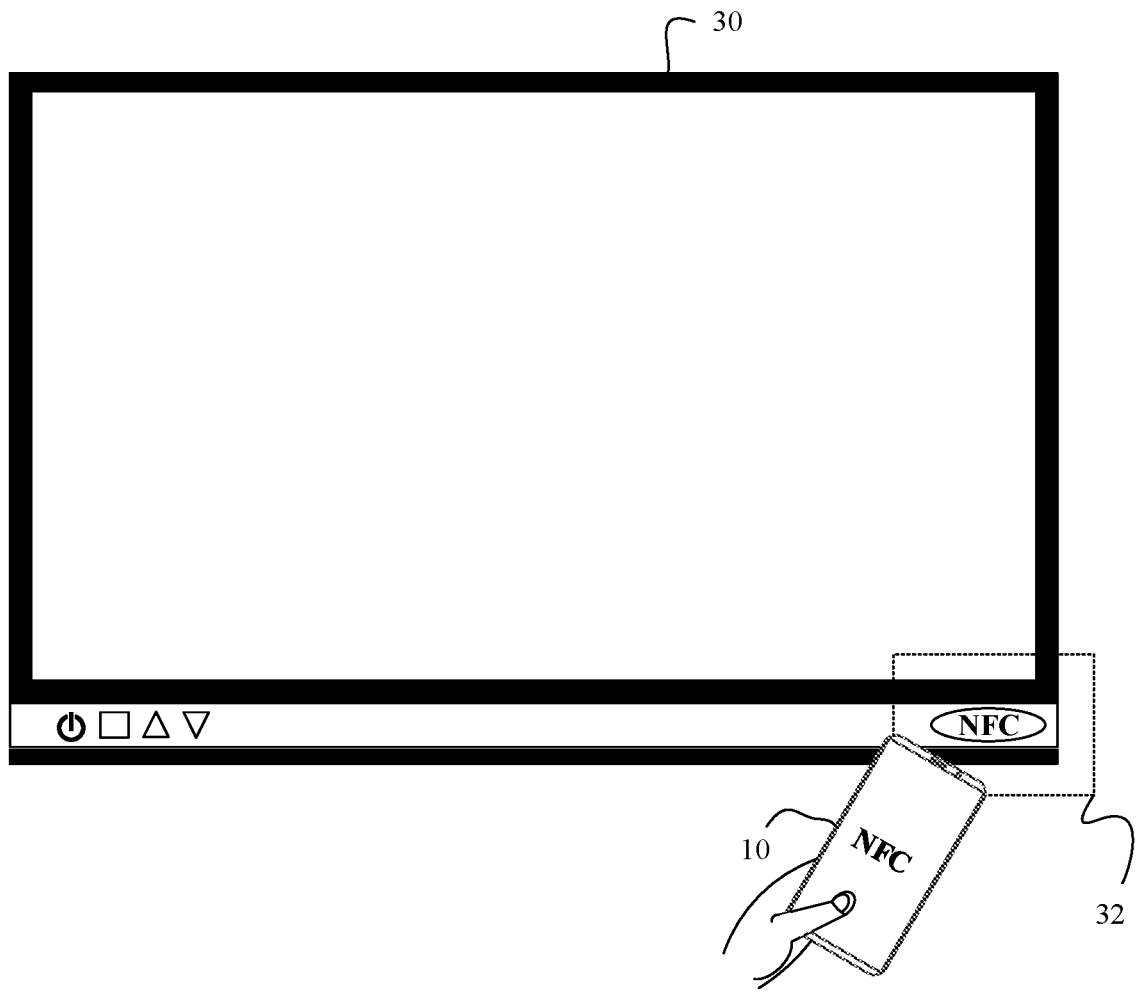
FIG. 3A is a schematic diagram of obtaining an identifier of a controlled terminal according to an embodiment of this application.

In some possible implementations, the mobile terminal 10 supports NFC. The first client 100 can obtain the identifier of the controlled terminal 30 by using an NFC module of the mobile terminal 10. FIG. 3A is a schematic diagram of obtaining the identifier of the controlled terminal 30 in an NFC manner. As shown in FIG. 3A, a user may hold the mobile terminal 10, to move the mobile terminal 10 close to an NFC sensing area 32 of the controlled terminal 30, so that the mobile terminal 10 establishes a connection to the controlled terminal 30. Then, the first client 100 obtains the identifier of the controlled terminal 30 through the connection.

FIG. 3A is described by using an example in which the controlled terminal 30 has a built-in NFC function. In some possible implementations, the identifier of the controlled terminal 30 may alternatively be stored in an independent NFC module, for example, an NFC card. The NFC card may be separated from the controlled terminal 30. For example, in an enterprise conference scenario, the NFC card may be placed at a position that can be conveniently touched by the user (for example, a conference participant) by using the mobile terminal 10, for example, a wall at a door of a conference room, a door frame, or a desk in a conference room.

It should be noted that, the touch herein may be that when a distance between the mobile terminal 10 and the NFC card is less than a preset value, it is considered that the mobile terminal 10 touches the NFC card. After the mobile terminal 10 touches the NFC card, the mobile terminal 10 establishes a connection to the NFC card, and obtains the identifier that is of the controlled terminal 30 and that is stored in the NFC card, so that the first client 100 can obtain the identifier.

Figure 3B:
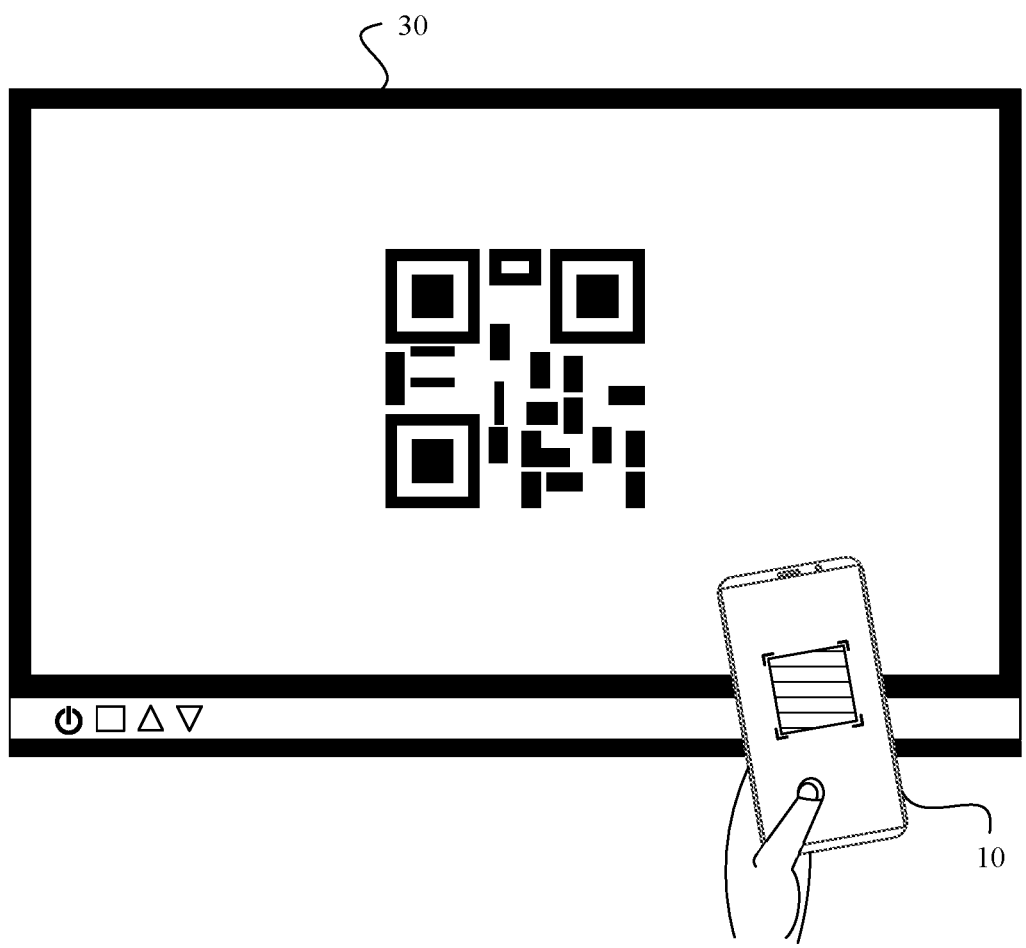
FIG. 3B is a schematic diagram of obtaining an identifier of a controlled terminal according to an embodiment of this application.

Manner 2: The mobile terminal 10 scans an identification code. In this way, the first client 100 running on the mobile terminal 10 can obtain the identifier of the controlled terminal In some other implementations, the mobile terminal 10 has a graphic scanning capability. Based on this, the mobile terminal 10 may further obtain the identifier of the controlled terminal 30 by scanning an identification code. The identification code may be a QR code, a bar code, or the like. FIG. 3B is a schematic diagram in which the mobile terminal 10 obtains the identifier of the controlled terminal 30 by scanning a QR code. As shown in FIG. 3B, the display of the controlled terminal 30 displays in advance a QR code, the user may hold the mobile terminal 10 and scan the QR code by using the mobile terminal 10, and the first client 100 running on the mobile terminal 10 may read the identifier of the controlled terminal 30 from the QR code.

The QR code may alternatively be pasted at a position that can be conveniently scanned by the user by using the mobile terminal 10, for example, a wall at a door of a conference room, a door frame, or a desk or a chair in a conference room. After the user scans the QR code by using the mobile terminal 10, the first client 100 running on the mobile terminal 10 reads the identifier of the controlled terminal 30 from the QR code.

Manner 3: The first client 100 running on the mobile terminal 10 receives the identifier that is of the controlled terminal 30 and that is entered by the user.

Figure 3C:
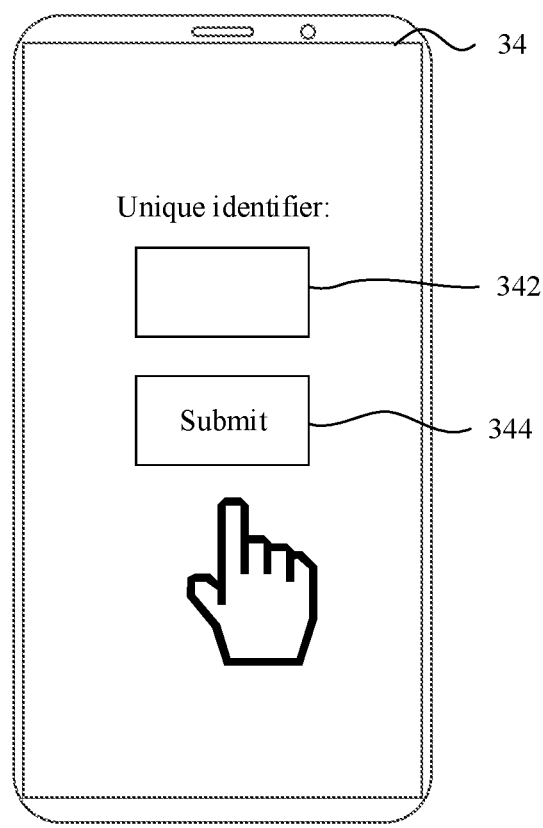
FIG. 3C is a schematic diagram of obtaining an identifier of a controlled terminal according to an embodiment of this application.

In some other implementations, the first client 100 running on the mobile terminal may further directly receive the identifier of the controlled terminal 30 entered by the user. FIG. 3C is a schematic interface diagram of an input interface of the mobile terminal 10, for example, an interface of the first client 100. As shown in FIG. 3C, the input interface 34 carries an input control 342 and a submission control 344, and the user may enter the identifier of the controlled terminal 30 by using the input control 342. Then, the user submits the identifier of the controlled terminal 30 by tapping the submission control 344, so that the first client 100 running on the mobile terminal 10 receives the identifier that is of the controlled terminal 30 and that is entered by the user.

Manner 4: The mobile terminal 10 is connected to the controlled terminal 30 through Bluetooth. In this way, the first client 100 running on the mobile terminal 10 can obtain the identifier of the controlled terminal 30 through Bluetooth.

In some other implementations, the first client 100 running on the mobile terminal may alternatively obtain the identifier of the controlled terminal 30 by using a Bluetooth module. In some embodiments, the mobile terminal 10 performs Bluetooth pairing with the controlled terminal 30. When pairing succeeds, the mobile terminal 10 can establish a connection to the controlled terminal 30, and the first client 100 running on the mobile terminal can obtain the identifier of the controlled terminal 30 from the controlled terminal 30.

Manner 5: The mobile terminal 10 is connected to the controlled terminal 30 through a wireless local area network or a wireless hotspot. In this way, the first client 100 running on the mobile terminal 10 can obtain the identifier of the controlled terminal 30.

In some other implementations, the mobile terminal 10 may be connected to the controlled terminal 30 through the wireless local area network or the wireless hotspot, and the first client 100 running on the mobile terminal 10 can obtain the identifier of the controlled terminal 30. The wireless local area network is used as an example. When the mobile terminal and the controlled terminal 30 access a same wireless local area network, the mobile terminal 10 and the controlled terminal 30 establish a connection by using an access point of the wireless local area network, and the first client 100 running on the mobile terminal 10 can obtain the identifier of the controlled terminal 30 through the connection.

The foregoing describes five manners in which the first client 100 obtains the identifier of the controlled terminal 30. A person skilled in the art may select any one of the manners to enable the first client 100 to obtain the identifier of the controlled terminal 30. The foregoing five manners are merely examples for description. A manner in which the first client 100 obtains the identifier of the controlled terminal 30 is not limited in this application. A person skilled in the art may select another manner according to an actual requirement.

S204: The first client 100 sends identity information of a user to the server end 200.

To avoid security degradation caused by an unauthorized user performing speech control on the controlled terminal 30, the first client 100 may send the identity information of the user to the server end 200, so that the server end 200 performs authentication on the user based on the identity information of the user, to ensure that all users performing speech control on the controlled terminal 30 are authorized users, thereby ensuring security.

The identity information is information that represents a user identity. The identity information may be any one or more of a physiological feature or a social feature of the user. The physiological feature includes but is not limited to a facial feature, a fingerprint feature, an iris feature, or the like of the user, and the social feature includes but is not limited to a name of the user, a mobile phone number, an identity card number, an employee ID, a UUID of the mobile terminal 10 of the user, or the like.

In some embodiments, the first client 100 may obtain the identity information of the user, and send the identity information to the server end 200. In consideration of user privacy security, the first client 100 may further encrypt the identity information, and then send encrypted identity information, for example, a token obtained by encrypting the identity information, to the server end 200.

S206: The server end 200 verifies the identity information of the user.

The server 20 may maintain a user information base, where the user information base stores identity information of an authorized user. The authorized user refers to a user who meets a specified condition, for example, an internal employee of a company or an expatriate of an external supplier that cooperates with the company. The server end 200 may match the identity information of the user against identity information stored in the user information base, to verify the identity information of the user, that is, perform authentication on the identity information of the user. In some embodiments, when the identity information of the user is hit in the user information base, it indicates that verification succeeds; or when the identity information of the user is not hit in the user information base, it indicates that verification fails.

It should be noted that when receiving the encrypted identity information such as the token, the server end 200 may further decrypt the encrypted identity information to obtain plaintext identity information, and then perform identity verification based on the plaintext identity information. In some embodiments, the user information base may also store encrypted identity information, and the first client 100 and the server end 200 use a same encryption key and encryption algorithm. In this way, the server end 200 may alternatively perform identity verification on the user by matching the encrypted identity information against the encrypted identity information stored in the user information base.

In some implementations, the server end 200 may alternatively use a user authentication service of a third-party application to perform identity verification on the user. For example, the server end 200 requests the user authentication service from the third-party application, to implement identity verification. For example, the server end 200 may send the identity information of the user to the third-party application, so that the third-party application performs identity verification on the user based on the identity information of the user. When a verification result is that verification succeeds, verification by the server end 200 succeeds; or when a verification result is that verification fails, verification by the server end 200 fails.

S208: The first client 100 collects speech data of the user.

In some embodiments, the user may wake up a microphone array provided by the mobile terminal 10, and then utter a speech that is specifically a speech corresponding to a function that the user intends to use, for example, increasing volume or decreasing brightness. The first client 100 collects the speech by using the microphone array provided by the mobile terminal 10, to obtain the speech data.

S210: The first client 100 sends a speech control request to the server end 200.

The first client 100 may generate the speech control request based on the speech data of the user. Further, the speech control request may further carry the identifier of the controlled terminal 30. The first client 100 sends the speech control request to the server end 200, to request to perform speech control on the controlled terminal 30 corresponding to the identifier.

The speech control request may include the speech data or text data corresponding to the speech data. In some implementations, the first client 100 may directly use the speech control request to carry the speech data of the user, and then send, to the server end 200, the speech control request that carries the speech data. In this way, the server end 200 may recognize the speech data of the user by using an ASR technology, to obtain the text data corresponding to the speech data of the user. In some other implementations, the first client 100 may alternatively first recognize the speech data of the user by using the ASR technology, to obtain the text data corresponding to the speech data of the user, then use the speech control request to carry the text data, and send the speech control request to the server end 200. In this way, a data processing amount of the server 20 in which the server end 200 is located can be reduced, and computing pressure of the server 20 can be reduced.

In some embodiments, the first client 100 may further use the speech control request to carry the identity information of the user and send the speech control request to the server end 200, so that the server end 200 can verify the identity information carried in the speech control request. In this way, a quantity of times of interaction between the first client 100 and the server end 200 can be reduced, network resource occupation can be reduced, and network resource utilization can be improved.

It should be noted that a sequence of performing S204 to S206 and S208 to S210 is not limited in this application. In some embodiments, S204 and S208 may be performed simultaneously or sequentially. For example, an execution sequence may be S208, S210, S204, and S206.

S212: When verification on the identity information of the user succeeds, the server end 200 generates a control instruction based on the speech control request.

If verification on the identity information of the user succeeds, it indicates that the user has control permission, for example, has control permission on the controlled terminal 30. Based on this, the server end 200 may generate the control instruction based on the speech control request, to control the controlled terminal 30 by using the control instruction.

The server end 200 may obtain a corresponding instruction template based on the speech control request, and then generate the control instruction based on the instruction template and the identifier of the controlled terminal. When the speech control request includes the text data corresponding to the speech data, the server end 200 may obtain a corresponding instruction template from an instruction set of the controlled terminal 30 based on the text data. When the speech control request includes the speech data, the server end 200 may first perform speech recognition on the speech data through ASR to obtain the corresponding text data, and then obtain a corresponding instruction template from an instruction set of the controlled terminal 30 based on the text data. The server 20 may combine the instruction template and the identifier of the controlled terminal 30, to generate the control instruction.

In some possible implementations, the server end 200 may alternatively generate the control instruction with reference to the identity information of the user. For example, the server end 200 may combine the instruction template, the identifier of the controlled terminal 30, and the identity information of the user, to generate the control instruction. In this way, the controlled terminal 30 may present the identity information, so that another user can know an identity of the user that currently controls the controlled terminal 30.

S214: The server end 200 sends the control instruction to the second client 300.

The server end 200 sends, based on the identifier of the controlled terminal 30 carried in the speech control request, the control instruction to the controlled terminal 30 corresponding to the identifier, and the second client 300 can receive the control instruction, to implement speech control on the controlled terminal 30.

In some possible implementations, the server end 200 may specify an IP address of the controlled terminal 30 in a hypertext transfer protocol (HTTP) request delivery manner, and send the foregoing new control instruction to the second client 300.

S216: The second client 300 indicates the controlled terminal 30 to execute the control instruction.

The second client 300 indicates the controlled terminal 30 to execute the control instruction (for example, a control instruction combined with a MAC address), to implement a corresponding function. For example, the second client 300 may indicate the controlled terminal 30 to execute a brightness reduction instruction, to reduce brightness of a display of the controlled terminal 30. For another example, the second client 300 may indicate the controlled terminal 30 to execute a volume increase instruction, to increase speaker volume of the controlled terminal 30.

Further, the controlled terminal 30 may include a controller and a display. The second client 300 may indicate the controller to execute the foregoing control instruction, to control the display, for example, adjust brightness, or switch screen display content.

It should be noted that the foregoing S212 to S216 are merely a schematic implementation in which the server end 200 controls the controlled terminal 30 based on the speech control request in this embodiment of this application, and do not constitute a limitation on the technical solutions of this application.

Based on the foregoing content description, an embodiment of this application provides a speech control method. In the method, speech data of a user is collected by using a microphone array provided by a mobile terminal 10 of the user, a speech control request can be generated based on the speech data, and then a server end 200 controls a controlled terminal based on the speech control request. Even if the controlled terminal 30 has no speech chip or microphone array, the user can still perform speech control on the controlled terminal 30 by using the mobile terminal 10 and a server 20. In this way, the controlled terminal 30 that does not have native support for speech control can also support speech control, and the controlled terminal 30 does not need to be reconstructed, so that costs are reduced and availability is improved. In addition, the server end 200 further performs identity verification on the user based on identity information sent by a first client 100 running on the mobile terminal 10. When verification succeeds, the server end 200 controls the controlled terminal 30 based on the speech control request. In this way, an unauthorized user can be prevented from performing speech control on the controlled terminal 30, and security is improved.

To help the user control the controlled terminal 30, after the server end 200 verifies the identity information of the user and verification succeeds, the server end 200 may send a function list to the first client 100 based on the identity information of the user, and the first client 100 displays the function list to the user, so that the user can select a corresponding function from the function list to perform speech control.

Figure 4:
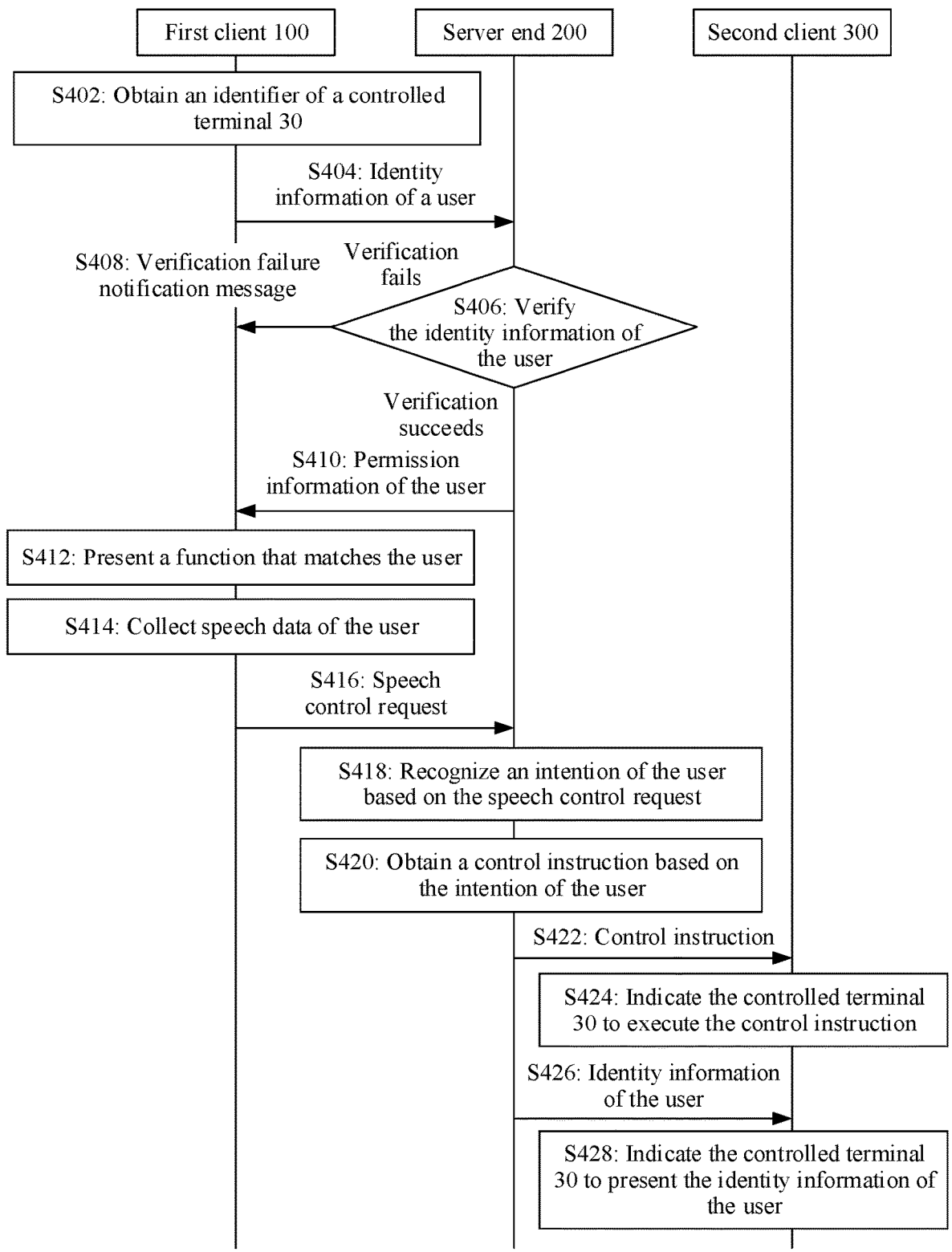
FIG. 4 is an interaction flowchart of a speech control method according to an embodiment of this application.

The following provides descriptions with reference to an interaction flowchart of a speech control method shown in FIG. 4. The method includes the following steps.

S402: The first client 100 obtains an identifier of the controlled terminal 30.

S404: The first client 100 sends identity information of a user to the server end 200.

S406: The server end 200 verifies the identity information of the user; and if verification fails, performs S408; or if verification succeeds, performs S410.

S408: The server end 200 returns a verification failure notification message to the first client 100.

When verification fails, the server end 200 returns the verification failure notification message to the first client 100, to indicate that the user is an unauthorized user or does not have control permission, and therefore verification fails. Based on this, the first client 100 may provide identity information again, and then the foregoing method steps are performed again.

S410: The server end 200 returns permission information of the user to the first client 100.

The permission information of the user is used to represent control permission of the user on the controlled terminal 30. For example, in a conference scenario, permission of an internal employee of a company may be different from that of an external supplier. In some examples, the internal employee of the company has permission to adjust brightness and volume, switch screen display content, perform file projection, and open a common file of the company, and the external supplier has the permission to adjust brightness and volume, switch screen display content, and perform file projection, but does not have the permission to open a common file of the company. Further, different internal employees of the company may have different permission. A common internal employee of the company has the permission to open a common file of the company, and a senior internal employee of the company further has permission to open a confidential file of the company.

In consideration of security, for different users, the server end 200 sets different permission based on identity information of the users. For example, the server end 200 pre-configures control permission of different users. In this way, the server end 200 may determine the permission information of the user based on the identity information of the user, and then return the permission information to the first client 100.

In some implementations, the permission information of the user may further be dynamically adjusted, to achieve a balance between a requirement and security. A conference scenario is used as an example. The server end 200 can dynamically allocate permission information to a conference participant based on a requirement of the participant in a conference process. For example, after a company employee Zhang San has delivered a speech on a business summary, a non-company employee Li Si needs to present a cooperation project in a second half of the year. In this case, the server end 200 may temporarily authorize the non-company employee Li Si to use a file page turning function, so that Li Si can turn a page of a related file. After Li Si completes presentation of the cooperation project, the server end 200 may cancel authorization of the file page turning function for Li Si.

S412: The first client 100 presents, to the user based on the permission information of the user, a function that matches the user.

The controlled terminal 30 has at least one speech control function. For example, the controlled terminal 30 may have speech control functions such as page switching and file projection. The function that matches the user is a function that can be used by the user. When permission information of users is different, the first client 100 presents different functions to the users.

In some implementations, the first client 100 determines, based on the permission information of the user, a function that matches the permission information, and then presents the function to the user. In this way, the user can select a corresponding function based on the function presented by the first client 100, to control the controlled terminal 30.

Figure 5A:
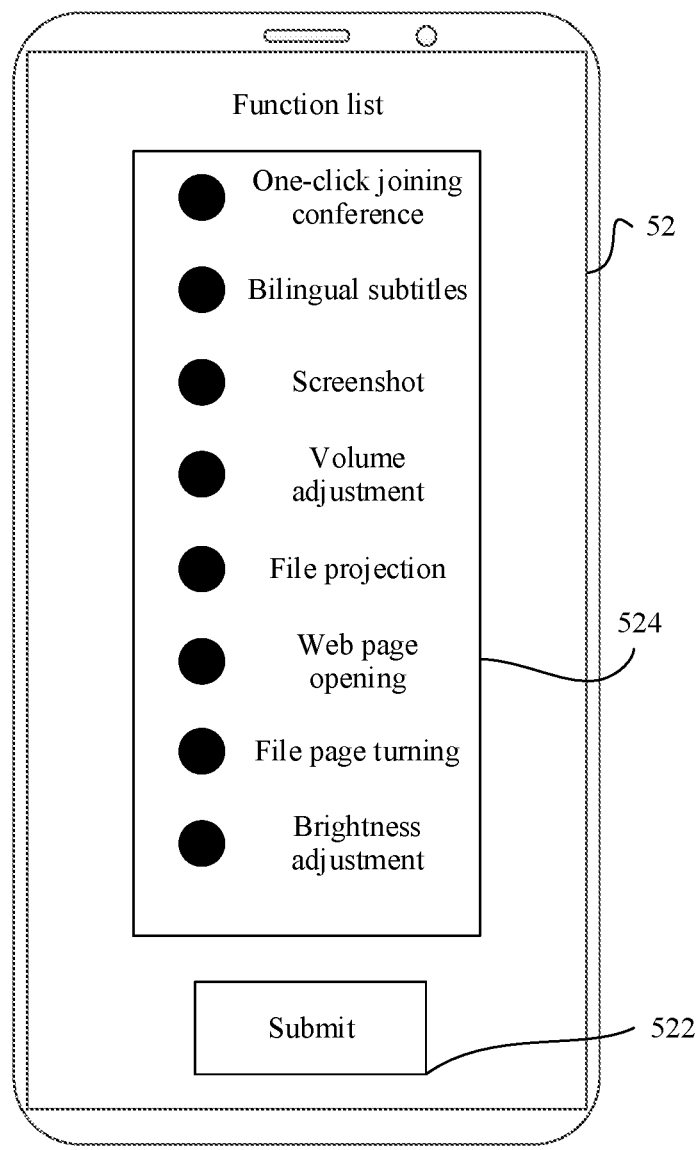
FIG. 5A is a schematic diagram of a function list according to an embodiment of this application.
Figure 5B:
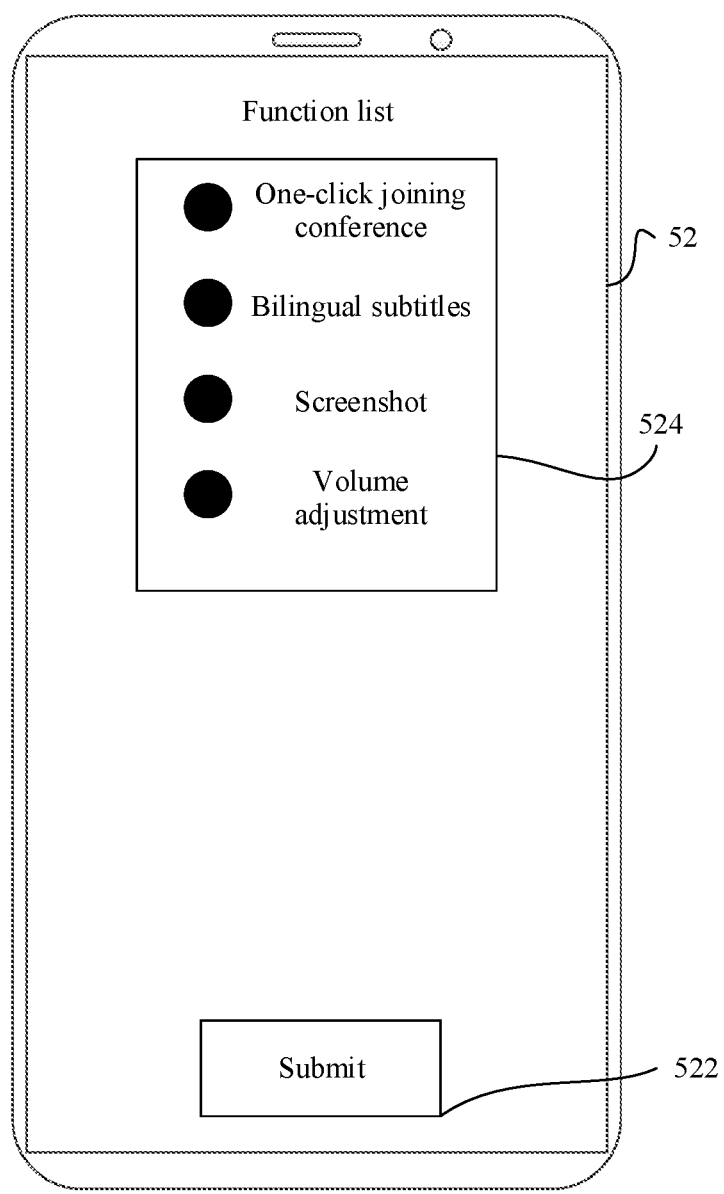
FIG. 5B is a schematic diagram of a function list according to an embodiment of this application.

FIG. 5A and FIG. 5B are schematic diagrams of lists of functions that can be used by a company employee and a non-company employee. It can be learned from FIG. 5A and FIG. 5B that, the first client 100 running on the mobile terminal 10 presents different function lists to different users, for example, presents more functions to the company employee, including one-click joining conference, bilingual subtitles, screenshot, volume adjustment, file projection, web page opening, file page turning, brightness adjustment, and the like, and presents fewer functions to the non-company employee, including one-click joining conference, bilingual subtitles, volume adjustment, and the like.

S408 to S412 are optional steps. In some embodiments, the first client 100 and the server end 200 may alternatively not perform the foregoing steps.

S414: The first client 100 collects speech data of the user.

The user may choose, based on function items displayed in the function list, to trigger a corresponding function by using a speech. For example, the user may utter a speech "increase volume", and the first client 100 running on the mobile terminal 10 collects speech data of the user, to implement volume control on the controlled terminal 30 by using the speech data. For another example, the user may utter a speech "join conference", and the first client 100 running on the mobile terminal 10 collects speech data of the user, to control, by using the speech data, the controlled terminal 30 to join the conference.

S416: The first client 100 sends a speech control request to the server end 200.

In some embodiments, the first client 100 may use the speech control request to carry the speech data of the user, and then send the speech control request to the server end 200. In some embodiments, the first client 100 may alternatively recognize the speech data through ASR, to obtain corresponding text data. Then, the first client 100 may use the speech control request to carry the text data corresponding to the speech data, and send the speech control request to the server end 200.

In addition, the first client 100 may alternatively first recognize the speech data of the user through ASR, to obtain the text data corresponding to the speech data, and then process the text data through NLP, to recognize an intention of the user. The first client 100 may directly use the speech control request to carry the intention (or an intention code), without carrying the speech data or the text data, and then send the speech control request to the server end 200. A data volume of the intention is less than a data volume of the text data or the speech data. In this way, transmission overheads can be reduced, and bandwidth resource occupation can be reduced. In addition, the server end 200 may directly obtain the intention of the user from the speech control request, so that the server 20 in which the server end 200 is located avoids consuming a large amount of computing power to perform intention recognition, and computing pressure of the server 20 is reduced.

In some possible implementations, the user may alternatively trigger control on the controlled terminal 30 by tapping a function item in the function list. A function list corresponding to the company employee is used as an example. A display interface 52 carries a submission control 522. The user may tap, according to prompt information in the display interface 52, a function item in a function list 524 displayed in the display interface 52, to select a function to be used, and then submit, to the server end 200 by using the submission control 522, a control request carrying an identifier of the function, to control the controlled terminal 30. For example, the company employee may tap the function item "one-click joining conference" displayed in the display interface 52. The first client 100 generates a control request in response to the foregoing operation of the user, and sends the control request to the server end 200. The server end 200 controls, based on the control request, the controlled terminal 30 to quickly join the conference.

S418: The server end 200 recognizes the intention of the user based on the speech control request.

When the speech control request includes the speech data of the user, the server end 200 may convert, through ASR, the speech data of the user into the text data corresponding to the speech data, and then the server end 200 processes, through NLP, the text data corresponding to the speech data, to recognize the intention of the user.

When the speech control request includes the text data corresponding to the speech data of the user, the server end 200 may directly process the text data through NLP, to recognize the intention of the user. In this way, the server 20 in which the server end 200 is located can be prevented from consuming a large amount of computing power to perform speech recognition, so that computing pressure of the server 20 is reduced.

When the speech control request includes the intention of the user, the server end 200 may directly obtain the intention of the user from the speech control request without performing operations such as speech recognition and intention recognition. This greatly reduces a computing amount and reduces computing pressure of the server 20.

A manner in which the server end 200 obtains the intention of the user is not limited in this embodiment of this application. A person skilled in the art may select a suitable manner based on an actual requirement, so that the server end 200 obtains the intention of the user. For example, the first client 100 directly sends the intention of the user to the server end 200, or the server end 200 recognizes the intention of the user based on the speech control request sent by the first client 100.

S420: The server end 200 obtains a control instruction based on the intention of the user.

In some embodiments, the server 20 stores an instruction set of at least one controlled terminal 30. For example, the server end 200 may store instruction sets of controlled terminals 30 of different brands, different series, and different models. The instruction set includes at least one control instruction supported by the controlled terminal 30, or an instruction template used to generate a control instruction. The control instruction is an instruction that can be identified by the controlled terminal 30, for example, may be a binary instruction.

The server end 200 may determine the instruction set of the controlled terminal 30 based on the identifier of the controlled terminal 30, and then search the instruction set of the controlled terminal 30 for a control instruction or an instruction template that matches the intention of the user. When searching succeeds, the server end 200 can obtain the control instruction, or obtain an instruction template of the control instruction, and then generate the corresponding control instruction based on the instruction template. When searching fails, the server end 200 may send prompt information to the first client 100, and the first client 100 presents the prompt information on a screen of the mobile terminal 10. The prompt information may be specifically used to prompt the user that the controlled terminal 30 does not support a function corresponding to the speech data of the user. For example, the controlled terminal 30 does not support a function such as file projection.

In some possible implementations, the server end 200 may first search, based on the intention, for at least one control instruction or instruction template that matches the intention, and then obtain, from the at least one control instruction or instruction template, a control instruction or an instruction template that matches the identifier of the controlled terminal 30, where the instruction template may be used to generate a corresponding control instruction. In this way, the server end 200 may control the corresponding controlled terminal by using the control instruction.

The server end 200 may pre-establish a mapping relationship between an intention and a control instruction in an instruction set, and store the mapping relationship in the server 20. In this way, the server end 200 may search, based on the mapping relationship, for the control instruction that matches the intention of the user. Further, to improve search efficiency, the server end 200 may alternatively establish a mapping relationship between an intention code and a control instruction in an instruction set, and store the mapping relationship in the server 20. After recognizing the intention of the user, the server end 200 determines an intention code corresponding to the intention, and then searches, by using the intention code, for the control instruction that matches the intention of the user.

The intention code may be specifically represented as a character string, for example, a digit string, a letter string, or a mixed string of digits and letters. In some implementations, the intention code may be VI (volume increase), used to represent increasing volume. Alternatively, the intention code may be VD (volume decrease), used to represent decreasing volume.

S422: The server end 200 sends the control instruction to the second client 300.

S424: The second client 300 indicates the controlled terminal 30 to execute the control instruction.

For specific implementation of S422 to S424, refer to related content descriptions in the embodiment shown in FIG. 2, and details are not described herein again.

S426: The server end 200 sends the identity information of the user to the second client 300.

In some embodiments, the identity information may also be combined with the instruction template to generate the control instruction. The server end 200 delivers the control instruction, to deliver the identity information of the user together.

S428: The second client 300 indicates the controlled terminal 30 to present the identity information of the user.

In some possible implementations, the server end 200 may send the identity information of the user to the second client 300. When the second client 300 indicates the controlled terminal 30 to execute the foregoing control instruction, the identity information of the user may further be displayed on a display, to prompt another user that the user has sent the foregoing control instruction. For example, the controlled terminal 30 may present a name, a department, or the like of the user that currently controls the controlled terminal 30. In this way, a conference participant may know the user that currently controls (for example, performs file projection on) the controlled terminal 30.

Figure 6:
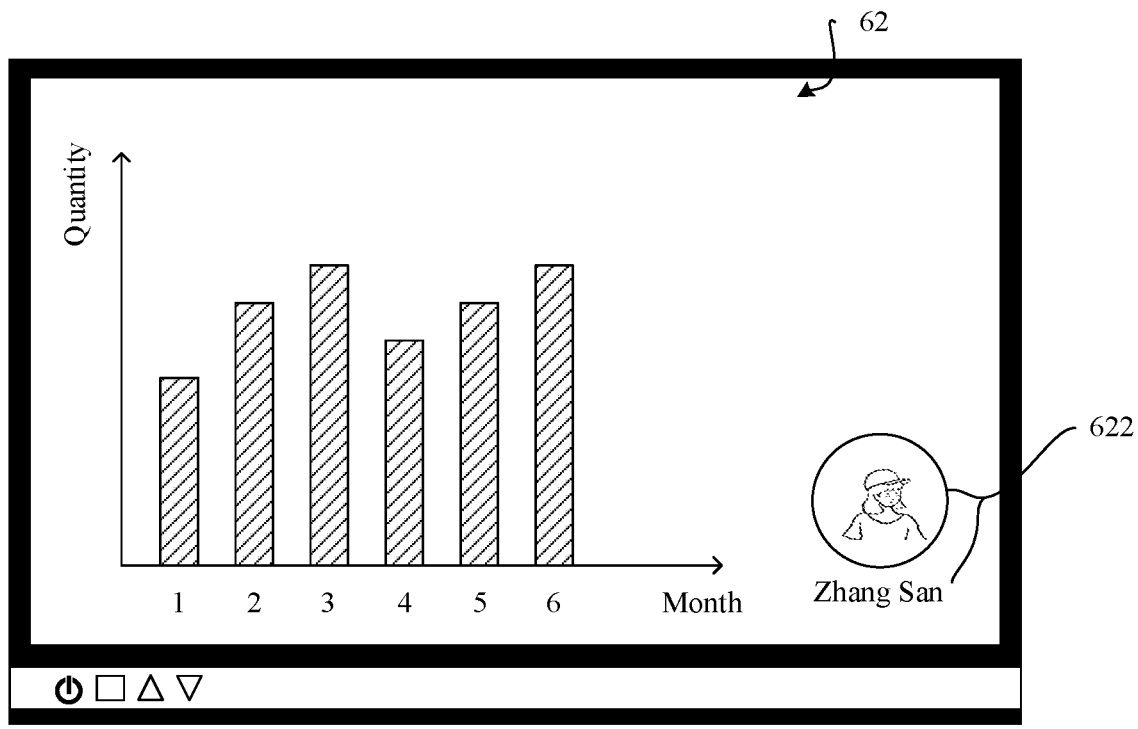
FIG. 6 is a schematic interface diagram of a display interface of a controlled terminal according to an embodiment of this application.

FIG. 6 is a schematic interface diagram of a display interface of the controlled terminal 30. As shown in FIG. 6, the display interface 62 displays identity information of a user who currently performs speech control on the controlled terminal 30, and the identity information may be any one or more of a name, a nickname, or a profile picture of the user. In the example in FIG. 6, the identity information of the user is presented by using a prompt box 622 in the display interface 62, and the prompt box 622 includes a user profile picture and a name. Other conference participants can learn, based on the prompt box 622, that the user currently controlling the controlled terminal 30 is Zhang San.

S426 and S428 are optional steps. In some embodiments, the foregoing steps may not be performed. The server end 200 may not send the identity information of the user to the second client 300, and then the second client 300 does not indicate the controlled terminal 30 to present the identity information of the user, or indicates the controlled terminal 30 not to present the identity information of the user.

It should be noted that a sequence of performing S422 and S426 is not limited in this application. S422 and S426 may be performed simultaneously or sequentially. Correspondingly, S424 and S428 may be performed simultaneously or sequentially.

It should be noted that the interaction flowchart shown in FIG. 4 is merely a schematic implementation provided in this embodiment of this application, and does not constitute a limitation on the technical solutions of this application. In this embodiment, a difference from the interaction flowchart shown in FIG. 2 is mainly described. For a same or similar part, refer to the foregoing embodiment and FIG. 2.

Based on the foregoing content descriptions, an embodiment provides a speech control method. In the method, a first client 100 first sends identity information of a user to a server end 200, and the server end 200 determines permission information of the user based on the identity information of the user, and feeds back the permission information to the first client 100. In this way, the first client 100 may recommend a corresponding function to the user based on the permission information, to provide some optional function items for the user, so that user experience is improved. Further, in a collaboration scenario, the server end 200 may further send, to a second client 300, identity information of a user who currently performs speech control on a controlled terminal 30, and the second client indicates the controlled terminal 30 to present the identity information of the user. In this way, another user can know an identity of the user who currently controls the controlled terminal 30, so that user experience is improved.

With reference to FIG. 1 to FIG. 6, the foregoing describes in detail the speech control system and the speech control methods provided in embodiments of this application. The following describes apparatuses and devices provided in embodiments of this application with reference to the accompanying drawings.

An embodiment of this application further provides a first client 100. The first client 100 runs on a mobile terminal 10, and is configured to implement speech control on a controlled terminal 30. The following describes the first client 100 with reference to FIG. 1. As shown in FIG. 1, the first client 100 includes:

a communications unit 102, configured to obtain identity information of a user, and send the identity information of the user to a server end;

a collection unit 104, configured to collect speech data of the user; and a request generation unit 106, configured to generate a speech control request based on the speech data of the user.

The communications unit 102 is further configured to send the speech control request to the server end.

In some implementations, the communications unit 102 is configured to:

obtain an identifier of the controlled terminal through near field communication NFC; or obtain an identifier of the controlled terminal by scanning an identification code; or receive an identifier that is of the controlled terminal and that is entered by the user; or obtain an identifier of the controlled terminal by connecting to the controlled terminal through Bluetooth; or obtain an identifier of the controlled terminal by connecting to the controlled terminal through a wireless local area network or a wireless hotspot.

In some implementations, the first client 100 further includes a display unit.

The communications unit 102 is configured to receive permission information of the user that is returned by the server end based on the identity information of the user.

The display unit is configured to present, on a screen of the mobile terminal, a function that matches the permission information of the user.

In some implementations, the communications unit 102 is configured to:

receive prompt information sent by the server end, where the prompt information is used to indicate that the controlled terminal does not support a function corresponding to the speech data of the user.

The display unit is configured to present the prompt information on the screen of the mobile terminal.

The first client 100 according to this embodiment of this application may correspondingly perform the methods described in embodiments of this application, and the foregoing and other operations and/or functions of the modules/units of the first client 100 are separately used to implement corresponding procedures of the methods in the embodiments shown in FIG. 2 and FIG. 4. For brevity, details are not described herein again.

An embodiment of this application further provides a server end 200. The server end 200 runs on a server 20, and is configured to implement speech control on a controlled terminal 30. The following describes the server end 200 with reference to FIG. 1. As shown in FIG. 1, the server end 200 includes:

a communications unit 202, configured to receive identity information of a user that is sent by a first client;

a verification unit 204, configured to verify the identity information of the user, where the communications unit 202 is further configured to receive a speech control request sent by the first client; and an instruction generation unit 206, configured to generate a control instruction based on the speech control request when verification on the identity information of the user succeeds.

The communications unit 202 is further configured to send the control instruction to a second client.

In some implementations, the server end 200 further includes:

a determining unit, configured to determine permission information of the user based on the identity information of the user.

The communications unit 202 is further configured to return the permission information of the user to the first client.

In some implementations, the communications unit 202 is further configured to:

send the identity information of the user to the second client.

In some implementations, the instruction generation unit 206 is configured to:

recognize an intention of the user based on the speech control request, and obtain the control instruction based on the intention of the user.

In some implementations, the instruction generation unit 206 is configured to:

search an instruction set corresponding to the controlled terminal for a control instruction that matches the intention of the user; and when searching succeeds, obtain the control instruction.

The communications unit 202 is configured to send prompt information to the first client when searching fails, where the prompt information is used to indicate that the controlled terminal does not support a function corresponding to speech data of the user.

The server end 200 according to this embodiment of this application may correspondingly perform the methods described in embodiments of this application, and the foregoing and other operations and/or functions of the modules/units of the server end 200 are separately used to implement corresponding procedures of the methods in the embodiments shown in FIG. 2 and FIG. 4. For brevity, details are not described herein again.

An embodiment of this application further provides a mobile terminal 10. The mobile terminal 10 is specifically configured to implement a function of the foregoing first client 100. The mobile terminal 10 may be a smart wearable device such as a smartphone, a tablet computer, a PDA, a smart band, a smart watch, or smart glasses. The following describes in detail hardware implementation of the foregoing mobile terminal 10 with reference to the accompanying drawings.

Figure 7:
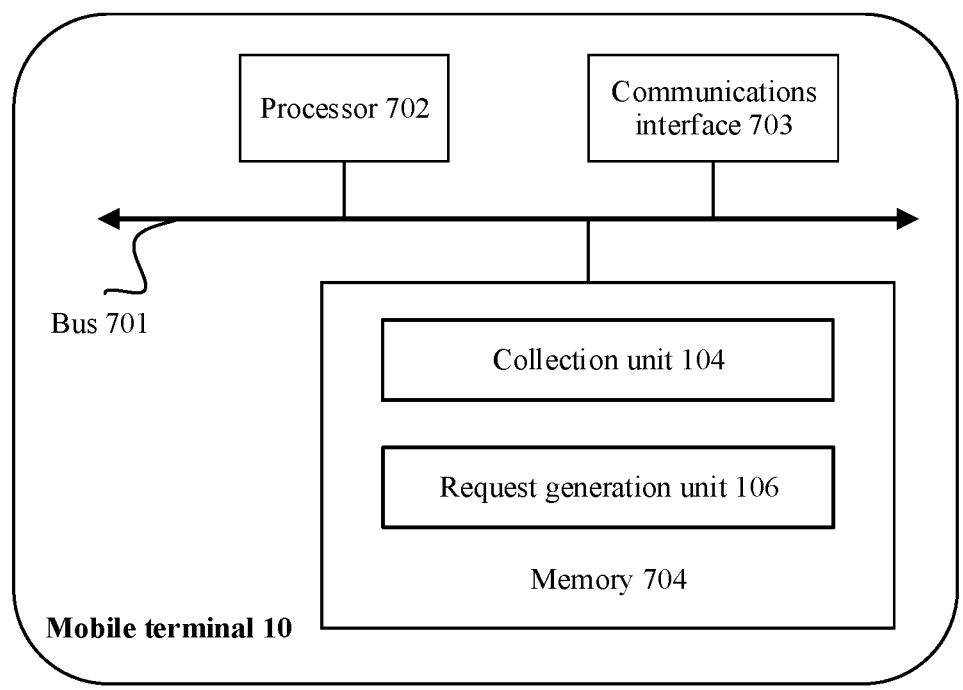
FIG. 7 is a schematic diagram of a computing device according to an embodiment of this application.

FIG. 7 is a schematic diagram of a structure of a mobile terminal 10. As shown in FIG. 7, the mobile terminal 10 includes a bus 701, a processor 702, a communications interface 703, and a memory 704. The processor 702, the memory 704, and the communications interface 703 communicate with each other by using the bus 701.

The bus 701 may be a peripheral component interconnect (PCI) bus, an extended industry standard architecture (EISA) bus, or the like. Buses may be classified into an address bus, a data bus, a control bus, and the like. For ease of representation, only one bold line is used for representation in FIG. 7, but this does not mean that there is only one bus or only one type of bus.

The processor 702 may be any one or more of processors such as a central processing unit (CPU), a graphics processing unit (GPU), a microprocessor (MP), or a digital signal processor (DSP).

The communications interface 703 is configured to communicate with the outside. For example, the communications interface 703 may be configured to send identity information of a user to a server end 200, and send a speech control request to the server end 200, or receive permission information of the user sent by the server end 200.

The memory 704 may include a volatile memory, for example, a random access memory (RAM). The memory 704 may further include a non-volatile memory, for example, a read-only memory (ROM), a flash memory, a hard disk drive (HDD), or a solid state drive (SSD).

The memory 704 stores executable code, and the processor 702 executes the executable code to perform the foregoing speech control method.

In some embodiments, when the embodiment shown in FIG. 1 is implemented and units of the first client 100 described in the embodiment shown in FIG. 1 are implemented by using software, software or program code required for performing functions of the collection unit 104 and the request generation unit 106 in FIG. 1 is stored in the memory 704. A function of the communications unit 102 is implemented by using the communications interface 703.

In some embodiments, the communications interface 703 obtains the identity information of the user, and sends the identity information of the user to the server end 200. The processor 702 executes program code that corresponds to the collection unit 104 and that is stored in the memory 704, to perform a step of collecting speech data of the user. The processor 702 executes program code that corresponds to the request generation unit 106 and that is stored in the memory 704, to perform a step of generating the speech control request based on the speech data. The bus 701 transmits, to the communications interface 703, the speech control request generated by the processor 702. The communications interface 703 is further configured to send the foregoing speech control request to the server end 200, to control a controlled terminal 30.

In some possible implementations, the processor 702 is further configured to perform the steps of the method corresponding to any implementation in the embodiment shown in FIG. 2 or FIG. 4.

An embodiment of this application further provides a server 20. The server 20 is specifically configured to implement a function of the foregoing server end 200. The server 20 may be a cloud server in a cloud environment, for example, a central server or an edge server, or may be a server in a local data center. The following describes in detail hardware implementation of the server 20 with reference to the accompanying drawings.

Figure 8:
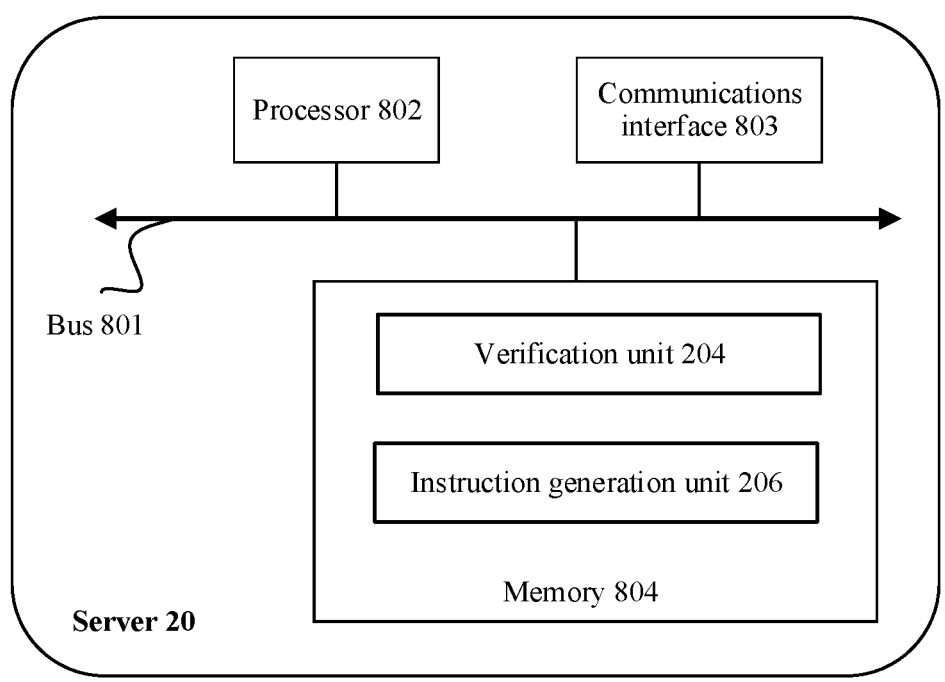
FIG. 8 is a schematic diagram of a computing device according to an embodiment of this application.

FIG. 8 is a schematic diagram of a structure of a server 20. As shown in FIG. 8, the server 20 includes a bus 801, a processor 802, a communications interface 803, and a memory 804. The processor 802, the memory 804, and the communications interface 803 communicate with each other by using the bus 801.

For specific implementations of the bus 801, the processor 802, the communications interface 803, and the memory 804, refer to related content descriptions in the embodiment shown in FIG. 7. The memory 804 stores executable code, and the processor 802 executes the executable code to perform the foregoing speech control method.

In some embodiments, when the embodiment shown in FIG. 1 is implemented and units of the server end 200 described in the embodiment shown in FIG. 1 are implemented by using software, software or program code required for performing functions of the verification unit 204 and the instruction generation unit 206 in FIG. 1 is stored in the memory 804. A function of the communications unit 202 is implemented by using the communications interface 803.

In some embodiments, the communications interface 803 receives identity information sent by a first client 100. The processor 802 executes program code that corresponds to the verification unit 204 and that is stored in the memory 804, to perform a step of verifying the identity information of a user. The communications interface 803 further receives a speech control request sent by the first client 100, and the speech control request is transmitted to the processor 802 by using the bus. The processor 802 executes program code that corresponds to the instruction generation unit 206 and that is stored in the memory 804, to perform a step of generating a control instruction based on the speech control request when identity verification succeeds. The bus 801 transmits, to the communications interface 803, the control instruction generated by the processor 803. The communications interface 803 is further configured to send the control instruction to a second client 300, to control a controlled terminal 30.

Embodiments of this application further provide a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a DVD), a semiconductor medium (for example, a solid-state drive), or the like.

The computer-readable storage medium includes a plurality of software packages, for example, a first software package, a second software package, and a third software package. When the first software package runs on the computing device, the speech control method performed by the foregoing first client 100 is performed. When the second software package runs on the computing device, the speech control method performed by the foregoing server end 200 is performed. When the third software package runs on the computing device, the speech control method performed by the foregoing second client 300 is performed.

Embodiments of this application further provide a computer program product. The computer program product includes one or more computer instructions. When the computer instructions are loaded and executed on a computer device, procedures or functions according to embodiments of this application are all or partially generated.

The computer instructions may be stored in a computer-readable storage medium or may be transmitted from a computer-readable storage medium to another computer-readable storage medium. For example, the computer instructions may be transmitted from a website, computer, or data center to another website, computer, or data center in a wired (for example, a coaxial cable, an optical fiber, or a digital subscriber line (DSL)) or wireless (for example, infrared, radio, or microwave) manner.

The computer program product may be a software installation package. When any one of the foregoing speech control methods needs to be used, the computer program product may be downloaded and executed on a computing device.

Descriptions of procedures or structures corresponding to the foregoing accompanying drawings have respective focuses. For a part that is not described in detail in a procedure or structure, refer to related descriptions of other procedures or structures.

What is claimed is:

1. A speech control system, wherein the speech control system comprises a first client, a server end, and a second client, the first client is configured to run on a mobile terminal, the server end is configured to run on a server, and the second client is configured to run on a controlled terminal;
the first client is configured to obtain identity information of a user, send the identity information of the user to the server end, collect speech data of the user, generate a speech control request based on the speech data, and send the speech control request to the server end, wherein the speech control request comprises an identifier of the controlled terminal, and
the first client is configured to perform one of:
obtain the identifier of the controlled terminal through near field communication (NFC);
obtain the identifier of the controlled terminal by scanning an identification code;
receive the identifier that is of the controlled terminal and that is entered by the user;
obtain the identifier of the controlled terminal by connecting to the controlled terminal through Bluetooth; and
obtain the identifier of the controlled terminal by connecting to the controlled terminal through a wireless local area network or a wireless hotspot;
the server end is configured to verify the identity information of the user, and when verification on the identity information of the user succeeds, generate a control instruction based on the speech control request, and send the control instruction to the second client; and
the second client is configured to indicate the controlled terminal to execute the control instruction.

2. The system according to claim 1, wherein
the server end is configured to return permission information of the user to the first client based on the identity information of the user; and
the first client is configured to present, on a screen of the mobile terminal, a function that matches the permission information of the user.

3. The system according to claim 1, wherein
the server end is configured to send the identity information of the user to the second client; and
the second client is further configured to present the identity information of the user on a screen of the controlled terminal.

4. The system according to claim 1, wherein
the server end is configured to recognize an intention of the user based on the speech control request, and obtain the control instruction based on the intention of the user.

5. The system according to claim 4, wherein
the server end is configured to search an instruction set corresponding to the controlled terminal for a control instruction that matches the intention of the user; and
when searching succeeds, obtain the control instruction; or when searching fails, send prompt information to the first client, wherein the prompt information is used to indicate that the controlled terminal does not support a function corresponding to the speech data of the user; and
the first client is configured to present the prompt information on the screen of the mobile terminal.

6. A speech control method, applied to a speech control system, wherein the speech control system comprises a first client, a server end, and a second client, the first client is configured to run on a mobile terminal, the server end is configured to run on a server, the second client is configured to run on a controlled terminal, and the method comprises:
obtaining, by the first client, identity information of a user, sending the identity information of the user to the server end, collecting speech data of the user, generating a speech control request based on the speech data, and sending the speech control request to the server end, wherein the speech control request carries an identifier of the controlled terminal, and
the method further comprises one of:
obtaining, by the first client, the identifier of the controlled terminal through near field communication NFC;
obtaining, by the first client, the identifier of the controlled terminal by scanning an identification code;
receiving, by the first client, the identifier that is of the controlled terminal and that is entered by the user;
obtaining, by the first client, the identifier of the controlled terminal by connecting to the controlled terminal through Bluetooth; or
obtaining, by the first client, the identifier of the controlled terminal by connecting to the controlled terminal through a wireless local area network or a wireless hotspot;
verifying, by the server end, the identity information of the user; and when verification on the identity information of the user succeeds, generating, by the server end, a control instruction based on the speech control request, and sending the control instruction to the second client; and indicating, by the second client, the controlled terminal to execute the control instruction.

7. The method according to claim 6, wherein the method further comprises:

returning, by the server end, permission information of the user to the first client based on the identity information of the user; and presenting, by the first client on a screen of the mobile terminal, a function that matches the permission information of the user.

8. The method according to claim 6, wherein the method further comprises:

sending, by the server end, the identity information of the user to the second client; and presenting, by the second client, the identity information of the user on a screen of the controlled terminal.

9. The method according to claim 6, wherein the generating, by the server end, a control instruction based on the speech control request comprises:

recognizing, by the server end, an intention of the user based on the speech control request; and obtaining, by the server end, the control instruction based on the intention of the user.

10. The method according to claim 9, wherein the obtaining, by the server end, the control instruction based on the intention of the user comprises:

searching, by the server end, an instruction set corresponding to the controlled terminal for a control instruction that matches the intention of the user; and when searching succeeds, obtaining the control instruction; or when searching fails, sending prompt information to the first client, wherein the prompt information is used to indicate that the controlled terminal does not support a function corresponding to the speech data of the user; and the method further comprises:

presenting, by the first client, the prompt information on the screen of the mobile terminal.

11. A non-transitory computer-readable storage medium, comprising instructions, wherein the instructions instruct a computer cluster to perform the method of:

obtaining, by a first client, identity information of a user, sending the identity information of the user to the server end, collecting speech data of the user, generating a speech control request based on the speech data, and sending the speech control request to the server end, wherein the speech control request carries an identifier of the controlled terminal, and the method further comprises one of:

obtaining, by the first client, the identifier of the controlled terminal through near field communication NFC;

obtaining, by the first client, the identifier of the controlled terminal by scanning an identification code;

receiving, by the first client, the identifier that is of the controlled terminal and that is entered by the user;

obtaining, by the first client, the identifier of the controlled terminal by connecting to the controlled terminal through Bluetooth; or obtaining, by the first client, the identifier of the controlled terminal by connecting to the controlled terminal through a wireless local area network or a wireless hotspot;

verifying, by a server end, the identity information of the user; and when verification on the identity information of the user succeeds, generating, by the server end, a control instruction based on the speech control request, and sending the control instruction to the second client; and indicating, by a second client, the controlled terminal to execute the control instruction;

wherein the first client runs on a mobile terminal, the server end runs on a server, the second client runs on a controlled terminal.

12. The computer-readable storage medium according to claim 11, wherein the method further comprises:

returning, by the server end, permission information of the user to the first client based on the identity information of the user; and presenting, by the first client on a screen of the mobile terminal, a function that matches the permission information of the user.

13. The computer-readable storage medium according to claim 11, wherein the method further comprises:

sending, by the server end, the identity information of the user to the second client; and presenting, by the second client, the identity information of the user on a screen of the controlled terminal.

14. The computer-readable storage medium according to claim 11, wherein the generating, by the server end, a control instruction based on the speech control request comprises:

recognizing, by the server end, an intention of the user based on the speech control request; and obtaining, by the server end, the control instruction based on the intention of the user.

15. The computer-readable storage medium according to claim 14, wherein the obtaining, by the server end, the control instruction based on the intention of the user comprises:

searching, by the server end, an instruction set corresponding to the controlled terminal for a control instruction that matches the intention of the user; and when searching succeeds, obtaining the control instruction; or when searching fails, sending prompt information to the first client, wherein the prompt information is used to indicate that the controlled terminal does not support a function corresponding to the speech data of the user; and the method further comprises:

presenting, by the first client, the prompt information on the screen of the mobile terminal.

* * * * *